US009041942B2

(12) United States Patent
Takahashi et al.

(10) Patent No.: US 9,041,942 B2
(45) Date of Patent: May 26, 2015

(54) IMAGE FORMING APPARATUS

(75) Inventors: Masamitsu Takahashi, Nagoya (JP); Katsumi Inukai, Iwakura (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 1370 days.

(21) Appl. No.: 12/695,531

(22) Filed: Jan. 28, 2010

(65) Prior Publication Data

US 2010/0195150 A1 Aug. 5, 2010

(30) Foreign Application Priority Data

Jan. 30, 2009 (JP) ................................ 2009-020709

(51) Int. Cl.

| | |
|---|---|
| ***G06F 3/12*** | (2006.01) |
| ***G06F 15/00*** | (2006.01) |
| ***G06K 1/00*** | (2006.01) |
| ***G03G 15/00*** | (2006.01) |
| ***G03G 15/16*** | (2006.01) |
| ***G03G 15/20*** | (2006.01) |
| ***G06F 1/00*** | (2006.01) |
| ***G06F 1/26*** | (2006.01) |
| ***G06F 1/32*** | (2006.01) |

(52) U.S. Cl.

CPC ........ *G03G 15/5004* (2013.01); *G03G 15/1675* (2013.01)

(58) Field of Classification Search

USPC ........ 358/1.5, 1.7, 1.12, 1.13, 1.14, 501, 504, 358/443, 1.18, 1.2, 1.6, 1.17, 449; 270/41, 270/52.07, 52.14; 382/112; 399/157; 715/274

See application file for complete search history.

(56) References Cited

U.S. PATENT DOCUMENTS 7,292,358 B2 * 11/2007 Ikegami et al. .............. 358/1.14
7,558,501 B2 * 7/2009 Saito et al. ...................... 399/88
7,894,085 B2 * 2/2011 Maeda ......................... 358/1.13

(Continued)

FOREIGN PATENT DOCUMENTS

JP 07-181814 7/1995
JP 2000-112297 4/2000

(Continued)

OTHER PUBLICATIONS

Notification of Reasons for Refusal for Japanese patent application No. 2009-020709 mailed May 19, 2011.
Notification of Reasons for Refusal for Japanese Patent Application No. 2009-020709, mailed Jan. 6, 2011.

*Primary Examiner* — Ghayour Mohammad
*Assistant Examiner* — Jonathan R Beckley
(74) *Attorney, Agent, or Firm* — Banner & Witcoff, Ltd.

(57) ABSTRACT

An image forming apparatus includes: an applying device configured to generate an output signal and apply the output signal to an image forming device; and a controller configured to generate a control signal to supply to the applying device so as to control a value of the output signal so that the value of the output signal is within a predetermined target range and control the applying device using the control signal in a start-up mode and in a normal mode, the normal mode being subsequent to the start-up mode. In the start-up mode, the controller sets a start control signal value larger than a value of the control signal immediately after a first predetermined time, the start control signal value being the value of the control signal during the first predetermined time, the first predetermined time being from a start timing of the start-up mode.

17 Claims, 8 Drawing Sheets

(56) References Cited

U.S. PATENT DOCUMENTS

| | | | | |
|---|---|---|---|---|
| 8,023,126 | B2 * | 9/2011 | Semma et al. | 358/1.14 |
| 2001/0055496 | A1 * | 12/2001 | Shimura et al. | 399/50 |
| 2002/0006289 | A1 * | 1/2002 | Takami et al. | 399/50 |

FOREIGN PATENT DOCUMENTS

| | | |
|---|---|---|
| JP | 2001-296720 | 10/2001 |
| JP | 2005-004073 | 1/2005 |
| JP | 2008-197168 | 8/2008 |

* cited by examiner

FIG.5

| INFLOW CURRENT [uA] | ~-1 | ~-2 | ~-3 | ~-4 | ~-5 | ~-6 | ~-7 |
|---|---|---|---|---|---|---|---|
| Initial_Duty [ % ] | 60 | 65 | 70 | 75 | 80 | 85 | 90 |
| Initial_Wait [ms] (K1) | 20 | 22 | 18 | 15 | 12 | 10 | 5 |

FIG.8

| LOAD RESISTANCE [MΩ] | 50 | 75 | 100 | 125 | 150 | 175 | 200 | 225 | 250 | 275 | 300 | hFE | PWM GAIN | STABILIZING TIME |
|---|---|---|---|---|---|---|---|---|---|---|---|---|---|---|
| CURRENT [-uA] | 25～ | 16.7～ | 12.5～ | 10～ | 8.3～ | 7.1～ | 6.3～ | 5.6～ | 5～ | 4.5～ | 4.2～ | LARGE | 100% | 40ms |
| | ～25 | ～16.7 | ～12.5 | ～10 | ～8.3 | ～7.1 | ～6.3 | ～5.6 | ～5 | ～4.5 | ～4.2 | MIDDLE | 125% | 35ms |
| | 0～15 | 0～10 | 0～7.5 | 0～6 | 0～5 | 0～4.3 | 0～3.8 | 0～3.3 | 0～3 | 0～2.7 | 0～2.5 | SMALL | 150% | 30ms |

IMAGE FORMING APPARATUS

CROSS REFERENCE TO RELATED APPLICATION

This application claims priority from Japanese Patent Application No. 2009-20709 filed on Jan. 30, 2009. The entire content of this priority application is incorporated herein by reference.

TECHNICAL FIELD

The present invention relates to an image forming apparatus or, specifically, to start of a high-voltage generation circuit used in the image forming apparatus.

BACKGROUND

An image forming apparatus uses high voltages such as, as is known, a transfer voltage. Furthermore, it is also known to control the duty ratio of a PWM signal so that the duty ratio increases in a stepwise manner and thereby gradually start up the transfer voltage.

However, due to various factors such as an inflow current into a transfer electrode, an hFE of a transistor, and a time of smoothing the PWM signal, a start-up time of the high-voltage power delays. This can cause insufficient target transfer output when the sheet has reached the image forming position, which results in lower image quality of the printed matter. On the other hand, in a case where a larger PWM value is applied from the beginning of starting the high-voltage power, the delay in the start time can be reduced. This, however, can cause overcurrent.

Thus, there is a need for an image forming apparatus that can reduce generation of overcurrent while suitably reducing delay in the output response of the output signal with respect to image formation.

SUMMARY

An aspect of the present invention is an image forming apparatus including: an image forming device configured to form an image on a recording medium; an applying device configured to generate a predetermined output signal and apply the output signal to the image forming device; and a controller configured to generate a control signal to supply to the applying device so as to control a value of the output signal so that the value of the output signal is within a predetermined target range and control the applying device using the control signal in a start-up mode and in a normal mode, the start-up mode being for starting the applying device, the normal mode being subsequent to the start-up mode. In the start-up mode, the controller sets a start control signal value larger than a value of the control signal immediately after a first predetermined time, the start control signal value being the value of the control signal during the first predetermined time, the first predetermined time being from a start timing of the start-up mode.

BRIEF DESCRIPTION OF THE DRAWINGS

FIG. 5 is a table illustrating a relation between an inflow current, an initial duty ratio, and an initial wait time;

FIG. 8 is a table illustrating a relation between the load resistance, the transfer current, a PWM changing gain, and a stabilizing time.

DETAILED DESCRIPTION

First Illustrative Aspect

A first illustrative aspect will be described with reference to FIGS. 1 through 5.

1. Schematic Configuration of Laser Printer

Figure 1:
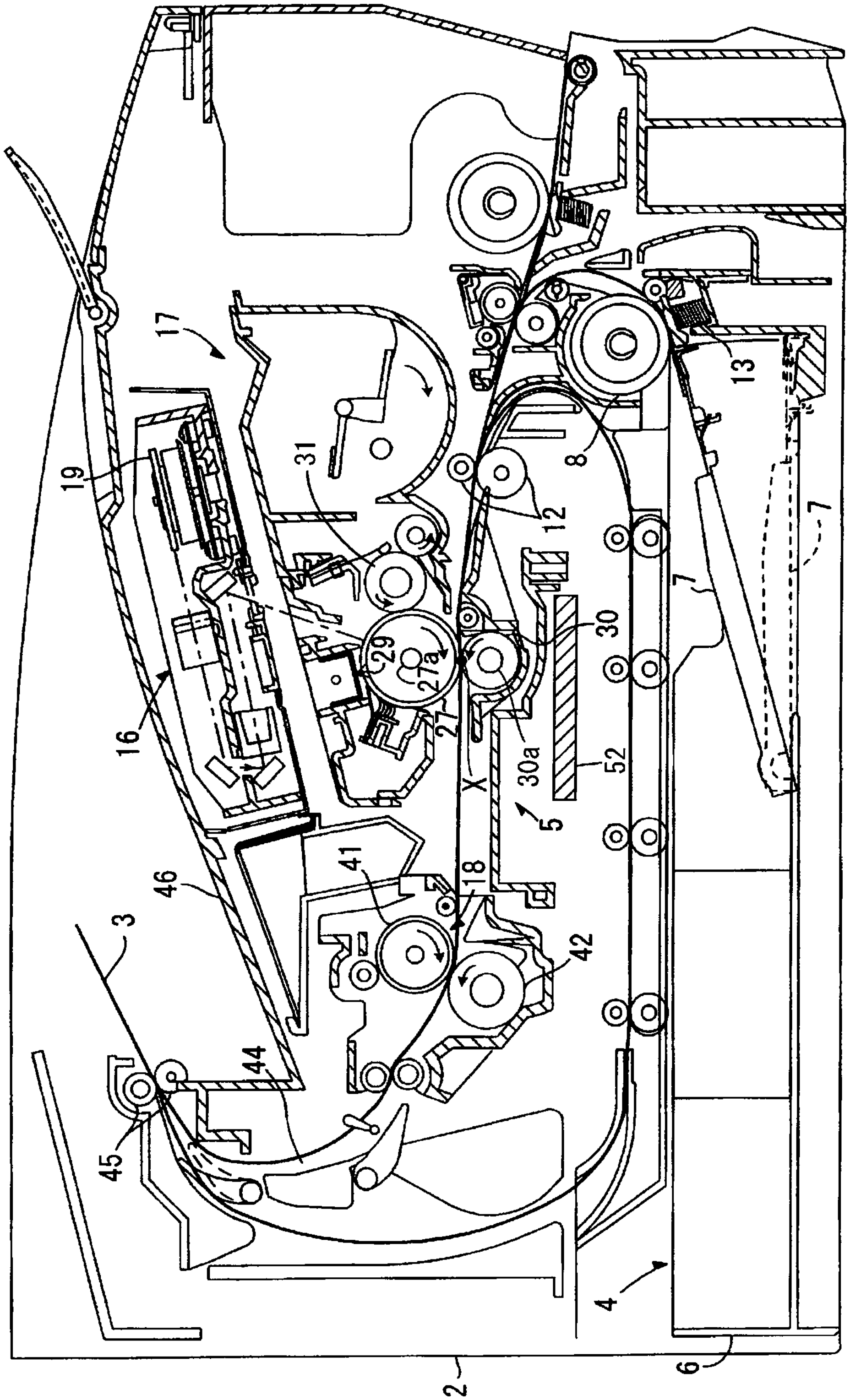
FIG. 1 is a schematic side sectional view of a printer of a first illustrative aspect in accordance with the present invention.

A laser printer (hereinafter referred to simply as a "printer") 1 (an illustration of an image forming apparatus) is illustrated in FIG. 1. Hereinafter, the right side in FIG. 1 will represent the front side of the laser printer 1, while the left side in the same figure will represent the rear side of the printer 1. Referring to FIG. 1, the printer 1 includes a body frame 2 and, inside the body frame 2, a feeder 4 for supplying sheets 3 (an illustration of a recording medium), an image forming unit 5 for forming an image on the sheet 3 supplied thereto, etc.

Note that the "image forming apparatus" may be a monochromatic printer and a two (or more) color printer. Furthermore, the "image forming apparatus" is not limited to a printing apparatus such as a printer (for example, a laser printer or a LED printer); the "image forming apparatus" may be a facsimile apparatus or a multifunction printer having a print function, a reader function (a scanner function), etc.

(1) Feeder

The feeder 4 includes a sheet supply tray 6, a sheet press plate 7, a sheet supply roller 8, and a registration roller 12. The sheet press plate 7 can turn around a rear end portion thereof. An uppermost one of the sheets 3 on the sheet press plate 7 is pressed toward the sheet supply roller 8. The sheets 3 are supplied one by one to the registration roller 12 by rotation of the sheet supply roller 8.

The registration roller 12 registers the sheet 3 supplied thereto. Thereafter, the sheet 3 is sent to a transfer position X. Note that the transfer position X is a position where a toner image on a photosensitive drum 27 is transferred to the sheet 3. The transfer position X shall be a contact position of the photosensitive drum 27 with a transfer roller 30 (an illustration of a transfer device).

(2) Image Forming Unit

The image forming unit 5 includes, for example, a scanner unit 16, a process cartridge 17, and a fixing unit 18.

The scanner unit 16 includes a laser emission unit (not illustrated), a polygon mirror 19, etc. Laser light (a dashed-dotted line in the figure) emitted from the laser emission unit is deflected by the polygon mirror 19 and irradiates a surface of the photosensitive drum 27.

The process cartridge 17 includes a developer roller 31, the photosensitive drum 27, a charger 29 of a scorotron type, and the transfer roller 30. Note that a drum shaft **27*a* of the photosensitive drum 27** is grounded.

The charger 29 uniformly and positively charges the surface of the photosensitive drum 27. Thereafter, the surface of the photosensitive drum 27 is exposed to the laser light from the scanner unit 16, and thus an electrostatic latent image is formed. Next, toner carried on a surface of the developer roller 31 is supplied to the electrostatic latent image formed on the photosensitive drum 27, and thus the electrostatic latent image is developed.

The transfer roller 30 includes a metal roller shaft 30*a*. The roller shaft 30*a* is connected to an applying circuit 60 (an illustration of an applying device) mounted on a circuit board 52 (see FIG. 2). At a time of a transfer operation, a transfer bias voltage Va is applied from the applying circuit 60.

While the sheet 3 is passing between a heat roller 41 and a pressure roller 42, the fixing unit 18 fuses the toner on the sheet 3. After the fusing, the sheet 3 is ejected through a sheet eject path 44 onto a sheet eject tray 46.

2. Configuration of Applying Circuit

Figure 2:
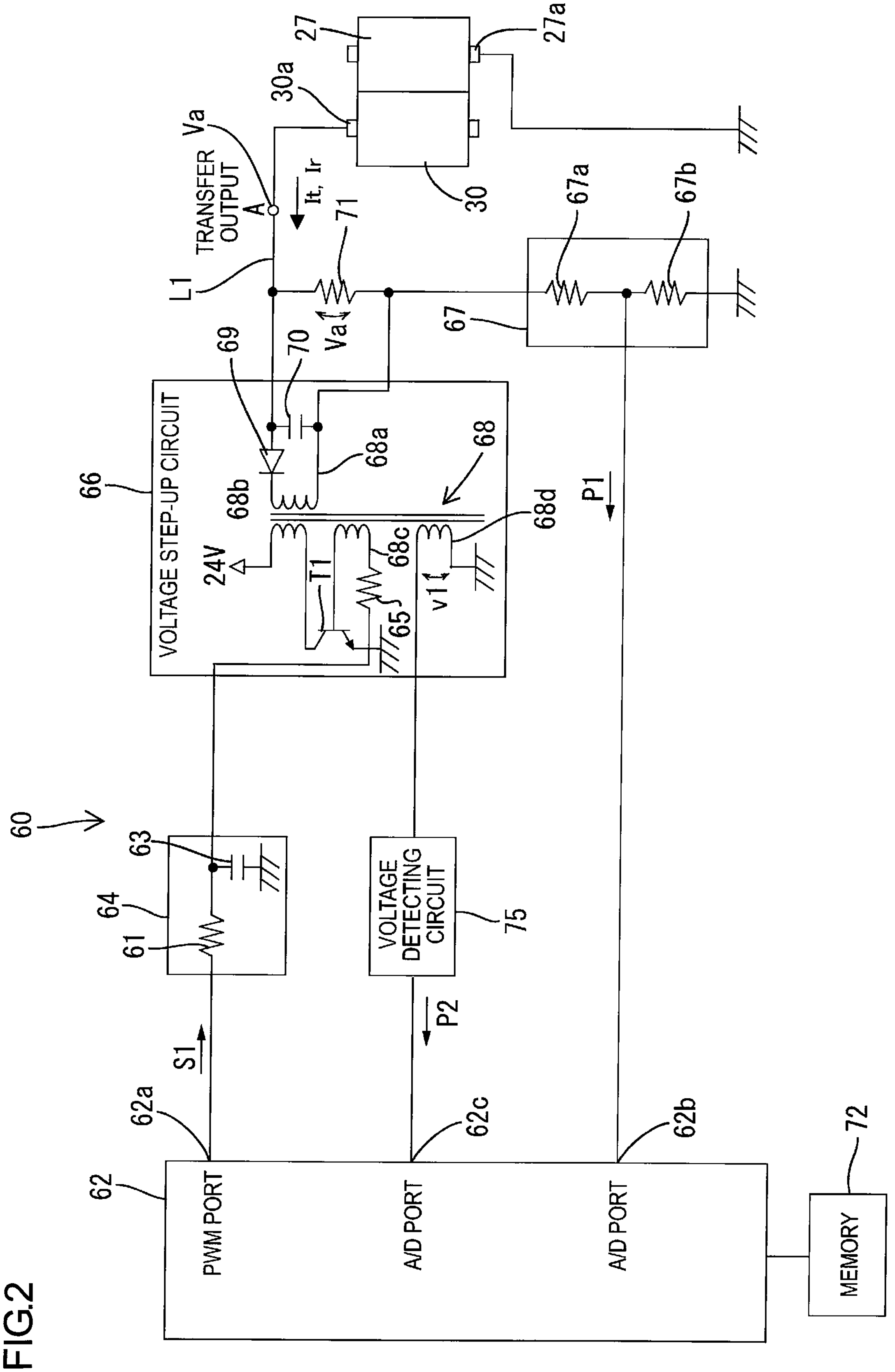
FIG. 2 is a block diagram of a schematic configuration of an applying circuit.

FIG. 2 is an illustration of a schematic configuration of the applying circuit 60, a control circuit 62 (an illustration of a controller), and a memory 72. The applying circuit 60 can apply the transfer bias voltage Va to the transfer roller 30. Various kinds of programs etc. to be executed by the control circuit 62 are stored in the memory 72.

The applying circuit 60 includes a smoothing circuit 64, a voltage step-up circuit 66, a current detecting circuit 67 (an illustration of an "output detecting device"), and a voltage detecting circuit 75 (an illustration of the "output detecting device").

The smoothing circuit 64 has, for example, a resistor 61 and a capacitor 63. The smoothing circuit 64 receives a PWM (Pulse Width Modulation) signal S1 (an illustration of a "control signal") from a PWM port 62*a* of the control circuit 62, smoothes the PWM signal S1, and supplies the smoothed PWM signal S1 to the base of a transistor T1 via a resistor 65 and a self-excitation winding 68*c* of the voltage step-up circuit 66. The transistor T1 can supply an exciting current to a primary winding 68*b* of the voltage step-up circuit 66 on a basis of the supplied PWM signal S1.

The voltage step-up circuit 66 includes a transformer 68, a diode 69, a smoothing capacitor 70, etc. The transformer 68 includes a secondary winding 68*a*, the primary winding 68*b*, the self-excitation winding 68*c*, and an auxiliary winding 68*d*. One end of the secondary winding 68*a* is connected to the roller shaft 30*a* of the transfer roller 30 via the diode 69 and a connecting line L1. On the other had, the other end of the secondary winding 68*a* is grounded via the current detecting circuit 67. Furthermore, the smoothing capacitor 70 and a discharge resistor 71 are connected in parallel to the secondary winding 68*a*.

With the above-described configuration, the primary voltage of the transformer 68 is stepped up, is rectified, and is applied as a transfer bias voltage (e.g. a negative high voltage) Va to the roller shaft 30*a* of the transfer roller 30. At this time, the transfer current It flowing through the transfer roller 30 flows into resistors 67*a*, 67*b* of the current detecting circuit 67 (taking a value of the current that flows in the direction of an arrow in FIG. 2). A detection signal P1 corresponding to this transfer current It is fed back to an A/D port 62*b* of the control circuit 62.

Then, at the time of the transfer operation when the sheet 3 has reached the above-described transfer position X and the toner image on the photosensitive drum 27 is being transferred to the sheet 3, the control circuit 62 gives the PWM signal S1 to the smoothing circuit 64. Then, the transfer bias voltage Va is applied to the roller shaft 30*a* of the transfer roller 30 that is connected to the output end A of the voltage step-up circuit 66. Along with this, on a basis of the detection signal P1 according to a current value of the transfer current It flowing through the connecting line L1, the control circuit 62 outputs the PWM signal S1 having a duty ratio (an illustration of a value of the control signal) changed as required to the smoothing circuit 64. Thus, the control circuit 62 executes constant current control so that the current value of the transfer current It is within a target range.

3. Configuration for Measuring Load Resistance

Next, a configuration for calculating a load resistance R of a power supply path will be described. The power supply path runs from the above-described output end A to the ground via the transfer roller 30 and the photosensitive drum 27. Power is supplied to the transfer roller 30 through this power supply path.

As illustrated in FIG. 2, the voltage detecting circuit 75 of the applying circuit 60 is connected between the auxiliary winding 68*d* of the transformer 68 of the voltage step-up circuit 66 and the control circuit 62. The voltage detecting circuit 75 has, for example, a diode and a resistor (not illustrated). At the time of the transfer operation by the applying circuit 60, the voltage detecting circuit 75 detects an output voltage v1 generated between the auxiliary winding 68*d* and supplies a detection signal P2 to an A/D port 62*c*.

The control circuit 62 receives the detection signals P1, P2 and calculates the present load resistance R of the transfer roller 30 from the current value of the transfer current It and a voltage value of the output voltage v1. Here, the transfer bias Va can be estimated from the voltage value of the output voltage v1 and a relation between numbers of turns of the secondary winding 68*a*, the primary winding 68*b*, and the auxiliary winding 68*d*. Then, the load resistance R can be calculated using Formula 1 for the estimated transfer bias voltage Va, which is as follows:

$$Va=(67a+67b+R)*It \qquad \text{Formula 1}$$

Here, because the bias voltage Va, the resistances of the resistors 67*a*, 67*b*, and the transfer current It are determinate, the load resistance R can be calculated from Formula 1. Note here that the load resistance R includes resistances of the transfer roller 30 and the photosensitive drum 27 etc.

4. Start-Up Control of Transfer Current

Next, start-up control of the applying circuit 60 will be described with reference to FIGS. 3 through 5. The control circuit 62 executes the process illustrated in FIG. 3 in accordance with, for example, the programs stored in the memory 72. FIG. 5 is a table illustrating a relation between an inflow current Ir, an initial duty ratio (Initial_Duty) of the PWM signal S1 at the start time, and an initial wait time (Initial_Wait) K1. The initial wait time (Initial_Wait) K1 is a duration time of the initial duty ratio. Here, the initial duty ratio (Initial_Duty) corresponds to a "start control signal value", and the initial wait time (Initial_Wait) corresponds to a "first predetermined time". This table is, for example, stored in the memory 72.

Figure 3:
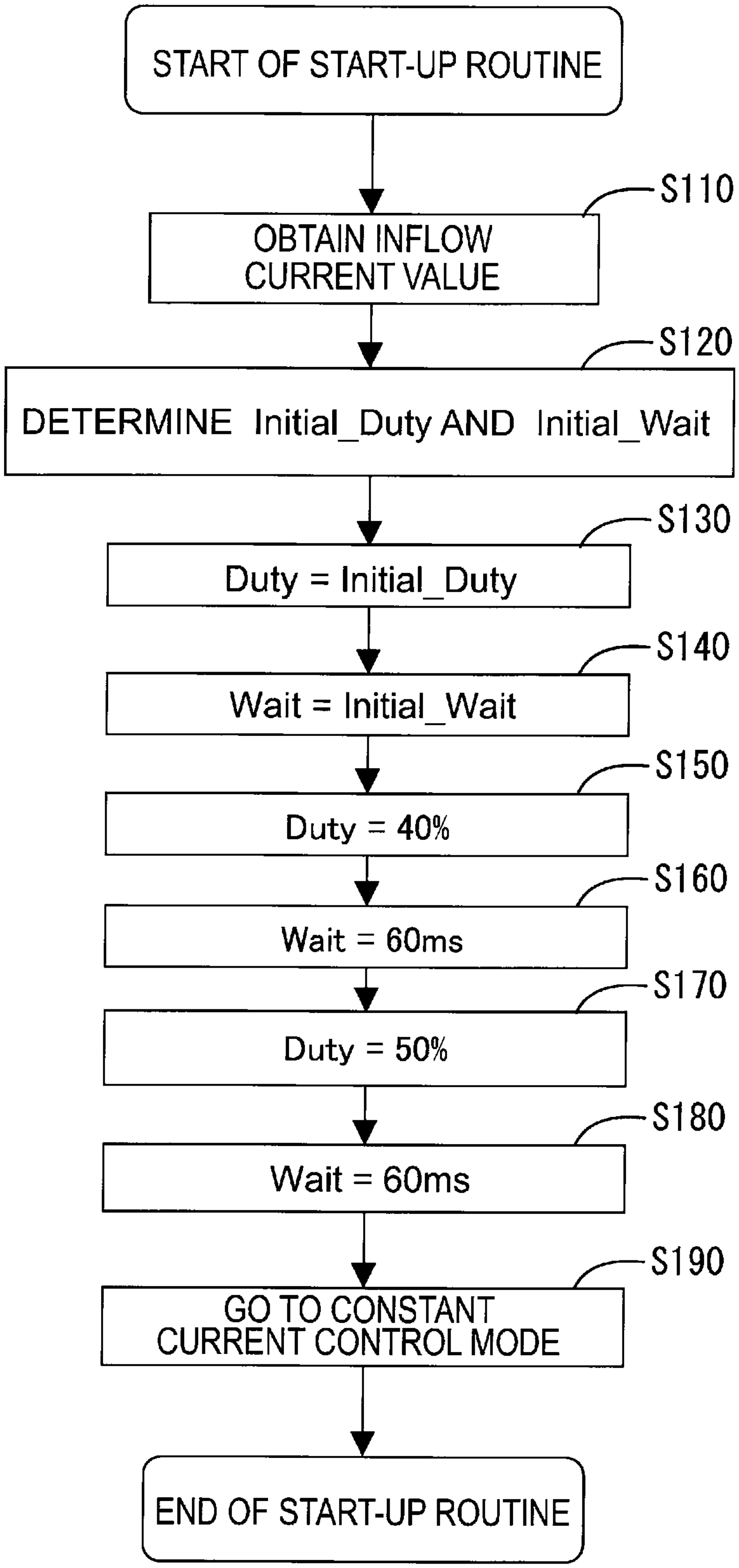
FIG. 3 is a flowchart illustrating a process of a start-up control of a transfer current of the first illustrative aspect.

Having received a print command in response to a print instruction from the user, the control circuit 62, first, in step S110 in FIG. 3, obtains a value of the inflow current Ir via the current detecting circuit 67. Thereafter, in step S120, the control circuit 62, referring to the table illustrated in FIG. 5, determines the initial duty (Initial_Duty) and the initial wait time (Initial_Wait) that correspond to the value of the inflow current Ir. Here, in a case of, for example, the detected inflow current Ir larger than 4 μA and equal to or smaller than 5 μA, the initial duty ratio (Initial_Duty) is determined at 80%, while the initial wait time (Initial_Wait) is determined at 12 ms (see FIG. 5).

Next, in step S130, the control circuit 62 generates the PWM signal S1 having the initial duty ratio (Initial_Duty) and starts supplying the PWM signal 51 to the smoothing circuit 64 (see the time point t0) so that the applying circuit 60 starts. Then, for example, the control circuit 62 supplies the PWM signal 51 having the initial duty ratio (Initial_Duty) of 80% to the smoothing circuit 64 during the initial wait time (Initial wait) K1 (corresponding to a time period from the time point t0 to the time point t1 in FIG. 4) of 12 ms (step S140). Note here that the initial duty ratio (Initial_Duty) should be determined at a value for the applying circuit 60 to start and for the transfer current It to reach a predetermined target range before the sheet 3 reaches the image forming position X.

After elapse of the initial wait time K1, the control circuit 62, in step S150, decreases the duty ratio of the PWM signal S1, for example, from 80% to 40%. Thereafter, the control circuit 62 supplies the PWM signal S1 having the duty ratio of 40% to the smoothing circuit 64 during a wait time of, for example, 60 ms (corresponding to a time period from the time point t1 to the time point t2 in FIG. 4) (step S160).

Figure 4:
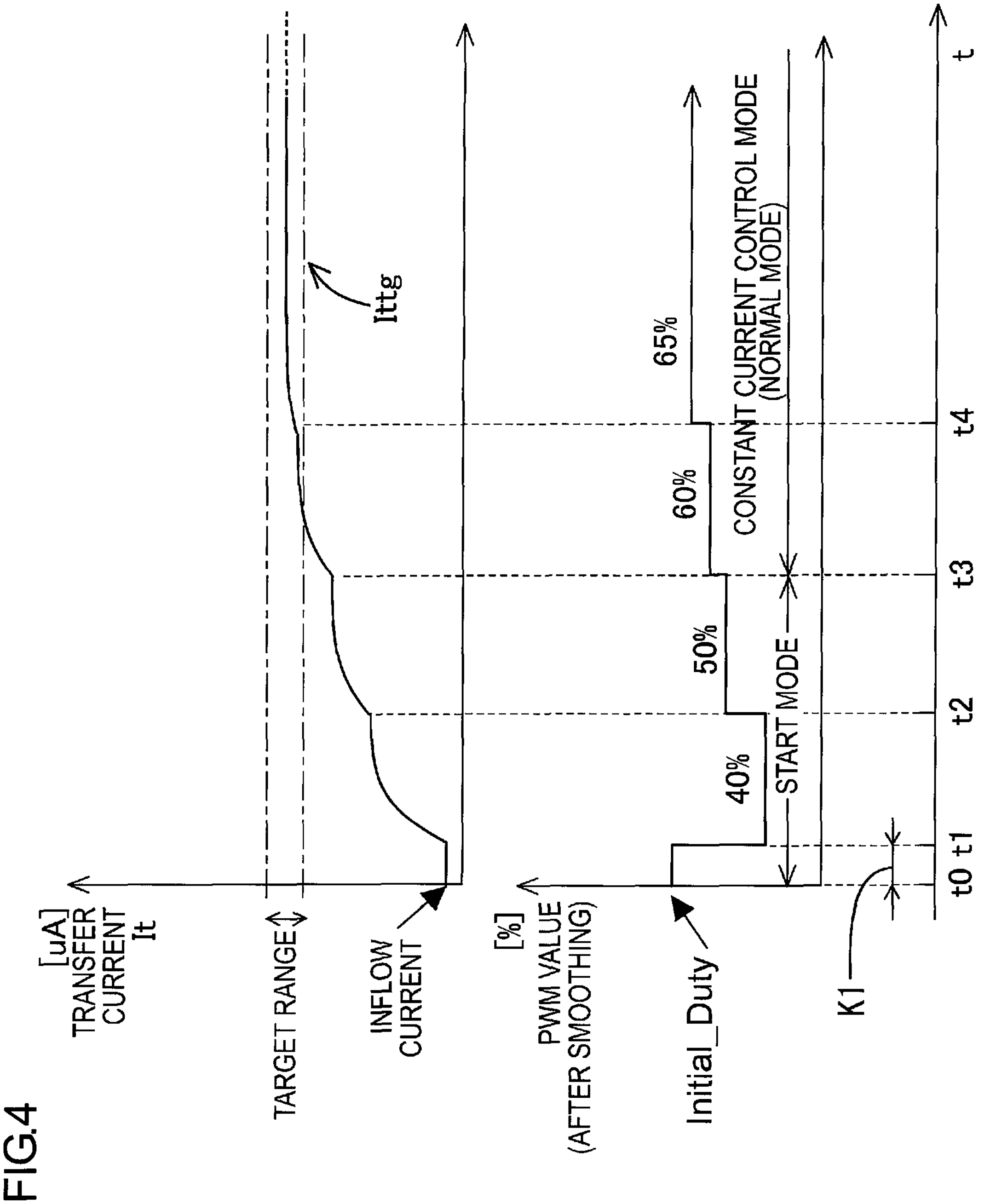
FIG. 4 is a time chart illustrating a relation between a duty ratio of a PWM signal and the transfer current of the first illustrative aspect.

After elapse of the wait time of 60 ms, the control circuit 62, in step S170, increases the duty ratio of the PWM signal S1, for example, from 40% to 50% and supplies the PWM signal S1 having the duty ratio of 50% to the smoothing circuit 64 during the wait time of, for example, 60 ms (corresponding to a time period from the time point t2 to the time point t3 in FIG. 4) (step S180).

Next, the control circuit 62 changes the control mode from a start-up mode to a constant current control mode (an illustration of a "normal mode") at the time point t3 in FIG. 4 (step S180). Note that the start-up mode corresponds to a time period between the time point t0 and the time point t3 in FIG. 4. The control circuit 62 controls the applying circuit 60 so that the transfer current It is maintained within the predetermined target range. For this purpose, the control circuit 62 further increases the duty ratio of the PWM signal S1 to 60% at the time point t3 and to 65% at the time point t4 so that the transfer current It has a predetermined target value Ittg. Note here that the control mode is changed on a basis of, for example, the magnitude of the transfer current It, i.e. the change timing is not limited to the time point t3 in FIG. 4.

5. Operations and Effects of First Illustrative Aspect

The control circuit 62 in the start-up mode determines (sets) the initial duty ratio of the PWM signal S1 during the initial wait time K1 (the first predetermined time) from a start timing of the start-up mode (the time point t0 in FIG. 4) at a value (e.g. 80%) that is larger than the duty ratio (e.g. 40%) immediately after elapse of the initial wait time K1. In other words, after elapse of the initial wait time K1 from the start timing of the start-up mode (the time point t0 in FIG. 4), the control circuit 62 decreases the duty ratio of the PWM signal S1 from 80% (the initial duty ratio) to 40%. Thus, because the initial duty ratio (the start control signal value) during the predetermined time K1 from start of the start-up mode is set large, the applying circuit 60 can be easily started. Therefore, delay in the output response of the transfer current It for image formation can be suitably reduced. As a result of this, a lower image quality of a printed matter due to the delay in the output response of the transfer current It can be reduced. Furthermore, because the duty ratio of the PWM signal S1 is set large only during the initial wait time K1, generation of overcurrent can be reduced.

Furthermore, because the initial duty ratio (the start control signal value) is set larger than the duty ratio (e.g. 60%) in the normal mode, the applying circuit 60 can more easily start. Furthermore, the duty ratio (e.g. 40% and 50%) in the start-up mode after the initial wait time K1 is set smaller than the duty ratio (e.g. 60%) in the normal mode and is gradually increased. Therefore, generation of overcurrent can be suitably reduced.

Furthermore, the control circuit 62 determines (sets) the initial duty ratio (Initial_Duty) and the initial wait time K1 in accordance with the inflow current Ir. For example, as illustrated in the table in FIG. 5, in a case where the inflow current Ir is large, the control circuit 62 starts the applying circuit 60 with the initial duty ratio (Initial_Duty) set larger during the short initial wait time K1; while, in a case where the inflow current Ir is small, the control circuit 62 starts the applying circuit 60 with the initial duty ratio (Initial_Duty) smaller than that of the case of the large inflow current Ir during the long initial wait time K1. Therefore, even in the case where the inflow current Ir exists, the applying circuit 60 can start suitably and without delay.

Second Illustrative Aspect

Figure 6:
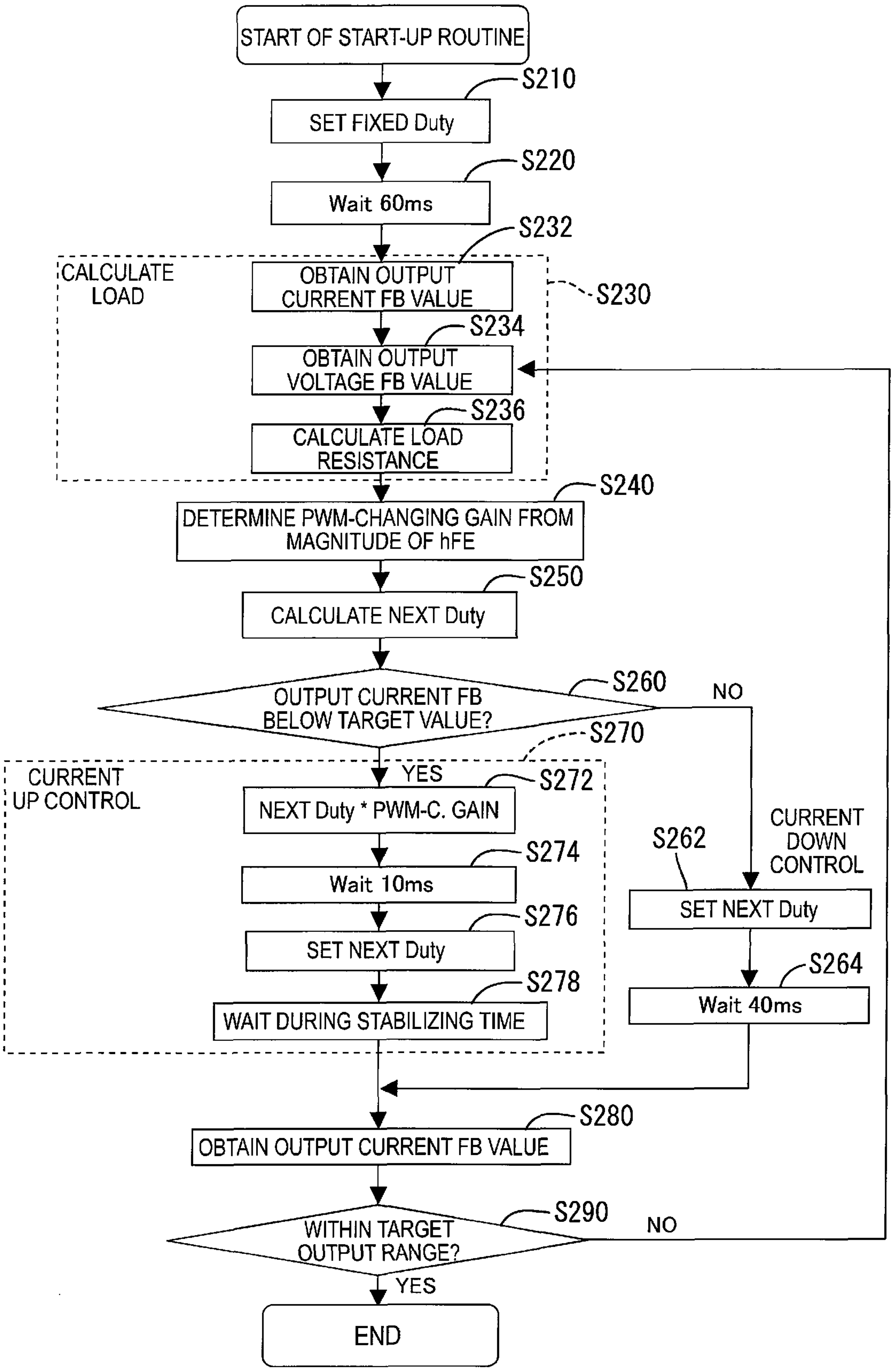
FIG. 6 is a flowchart illustrating a process of start-up control of the transfer current of a second illustrative aspect.

Next, the start-up control of the applying circuit 60 of a second illustrative aspect in accordance with the present invention will be described with reference to FIGS. 6 through 8. The process illustrated in FIG. 6 is, similar to that of the first illustrative aspect, executed by the control circuit 62 in accordance with the programs stored in the memory 72. FIG. 8 is a table illustrating a relation between the load resistance and the transfer current It and a PWM-changing gain and a stabilizing time. This table also illustrates the magnitude of hFE (the current gain), which is according to the transfer current It, of a transformer drive transistor T1 of the applying circuit. This table is, for example, stored in the memory 72. Hereinafter, only the configuration different from the first illustrative aspect will be described.

While the first illustrative aspect relates mainly to control of the initial wait time K1 of the start-up mode in the start control of the applying circuit 60, the second illustrative aspect relates mainly to control after elapse of the initial wait time K1 of the start-up mode in the start control of the applying circuit 60. Specifically, the load resistance of the applying circuit 60 is calculated at the start time of the applying circuit 60, the duty ratio of the PWM signal S1 is adjusted in accordance with the load resistance, and thereby delay in the applying circuit 60 due to the load resistance etc. is reduced.

Figure 7:
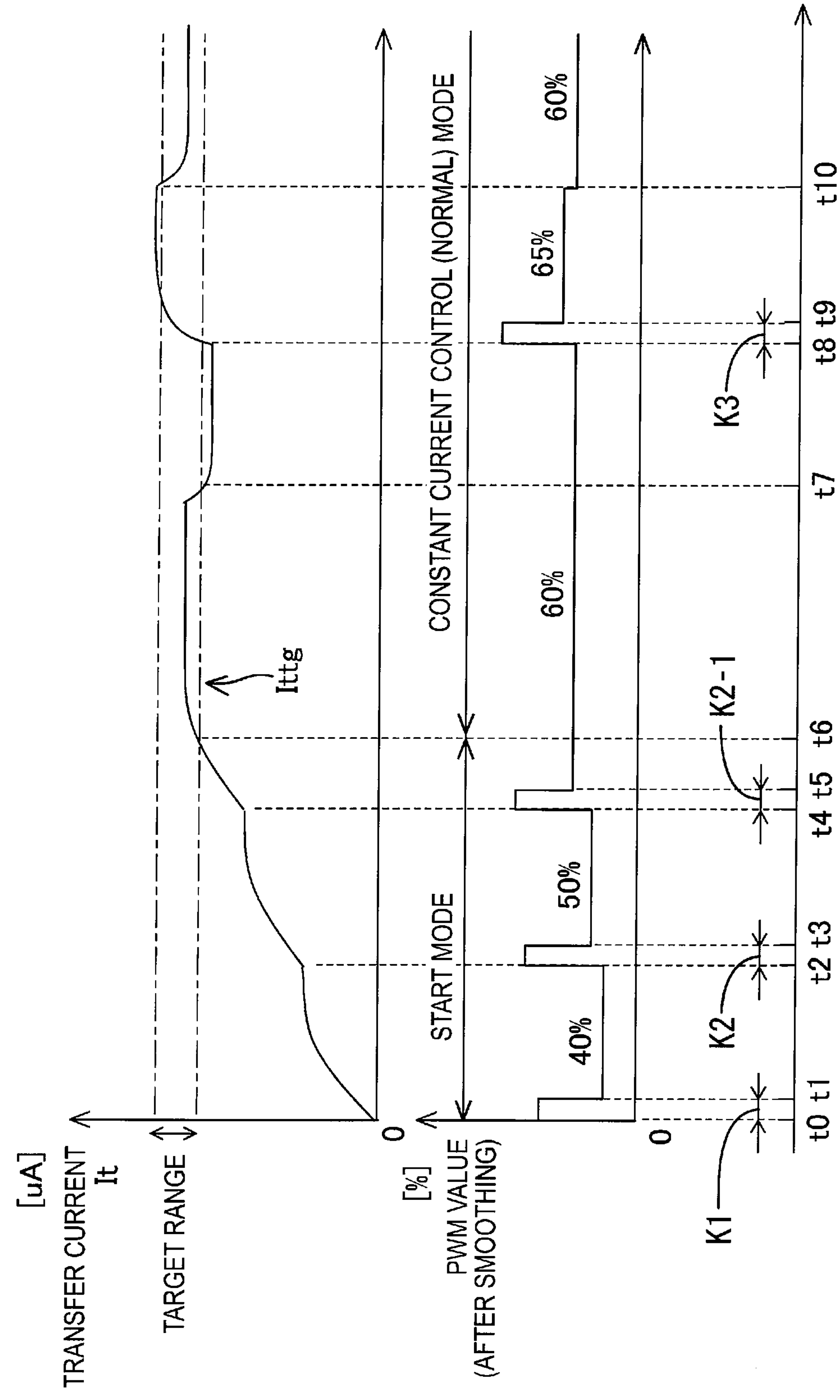
FIG. 7 is a time chart illustrating a relation between a duty ratio of the PWM signal and the transfer current of the second illustrative aspect.

Having received the print command in response to the print instruction from the user similar to the first illustrative aspect, before the time point t0 in FIG. 7, the control circuit 62, first, in step S210 in FIG. 6, generates the PWM signal S1 having a predetermined fixed duty ratio of, for example, 40% and supplies the PWM signal S1 to the smoothing circuit 64. Then, during a predetermined wait time of, for example, 60 ms, the control circuit 62 waits until the applying circuit 60 stabilizes (step S220).

Then, in step S230, the control circuit 62 (an illustration of a "calculating device") calculates the load resistance. Specifically, the control circuit 62 obtains an FB (feedback) value of the output current (the transfer current) It by the detection signal P1 (step 232) and obtains an FB (feedback) value of the output voltage (the transfer voltage) Va by the detection signal P2 (step S234). Then, in step S236, the control circuit 62 calculates the load resistance using the obtained transfer current It, the transfer voltage Va, and the above-described Formula 1.

Next, in step S240, the control circuit 62 determines the PWM-changing gain (an illustration of a "correction amount of the value of the control signal") and the stabilizing time using the table illustrated in FIG. 8 and in accordance with the values of the calculated load resistance and the obtained transfer current It. For example, as illustrated in FIG. 8, where the load resistance is 100 MΩ and the transfer current It is from 0 to 7.5 μk (to which the hFE of "SMALL" corresponds), the PWM-changing gain is determined at 150%, and the stabilizing time is determined at 30 ms. The stabilizing time corresponds to a time period t1-t2, a time period t3-t4, a time period t9-t10, etc. Note that determination of the stabilizing time may be omitted. That is, the stabilizing time may have a uniform value independent of the load resistance.

Next, in step S250, the control circuit 62 computes the duty ratio of the next cycle using the value of the detected transfer current It, the target current value, etc. The duty ratio of the PWM signal S1 computed here is used after the time point t0 in FIG. 7. Note that the initial duty ratio shall be, for example, the above-described fixed duty ratio of 40% (see FIG. 7).

Next, in step S260, the control circuit 62 determines whether the FB value of the output current, i.e. the transfer current It, is lower than the target value Ittg. If the transfer current It is lower than the target value Ittg (corresponding to time periods t0-t6 and t7-t8 in FIG. 7), current-UP control is performed. On the other hand, if the transfer current It is not lower than the target value Ittg (corresponding to time periods t6-t7 and substantially after the time point t8), the process goes to step S262 so that the current-DOWN control is performed.

In the current-UP control, first, in step S272, the control circuit 62 multiplies the next-time duty ratio computed in step S250 by the PWM-changing gain so that the next-time duty ratio is increased and supplies the PWM signal S1 having the increased next-time duty ratio to the smoothing circuit 64 during predetermined times K2 and K2-1 (each of which corresponding to a "second predetermined time") of, for example, 10 ms (time periods t2-t3 and t4-t5 in FIG. 7) (step S274 and step S276).

Then, after elapse of the predetermined time K2, i.e. at the time point t3 in FIG. 7, the control circuit 62 supplies the PWM signal S1 having the next-time duty ratio before increase, e.g. the duty ratio of 50%, to the smoothing circuit 64 for the stabilizing time determined in step S240 (e.g. 30 ms) (step S278).

Note that, in the current-UP control, which corresponds to the time point t0 in FIG. 7, of the initial cycle, the initial duty ratio (Initial_Duty) and the initial wait time K1 (a time period t0-t1 in FIG. 7) are determined as illustrated in FIG. 4.

Next, in step S280, similar to step S232, the control circuit 62 obtains the FB value of the output current (transfer current) It and, in step 290, determines whether the value of the transfer current It is within the target output range. If the value of the transfer current It is determined to be within the target output range, the process is temporarily stopped. On the other hand, if the value of the transfer current It is determined to be outside the target output range, the process returns to step S234 so that the above process is repeated.

Note that the above-described current-UP control is executed not only in the start-up mode but also in the normal mode (the constant current control) as illustrated in FIG. 7. That is, in order to increase the transfer current It that is outside the target range at the time point t7 in FIG. 7, the control circuit 62 executes the above-described current-UP control. By this control, the duty ratio of the PWM signal S1 during a predetermined time K3 (corresponding to a "third predetermined time") from the time point t8 in FIG. 7 is set larger than a value (65%) after the predetermined time K3.

In addition, in the current-decrease control (see after the time point t10 in FIG. 7), the PWM signal S1 having the next-time duty ratio computed in step S250 is supplied to the smoothing circuit 64 during a predetermined time (e.g. 40 ms) (step S262 and step 264). Then, after elapse of the predetermined time, the process goes to step S280. That is, the process using the PWM-changing gain is not performed in the current-DOWN control.

6. Operations and Effects of Second Illustrative Aspect

Typically, the transfer current It when being increased to the target value is influenced by the hFE of the transformer drive transistor T1. That is, the time to increase the transfer current It to the target value varies depending on a production tolerance of the transformer drive transistor T1. Generally, it takes more time to start up the transfer current It as the hFE is smaller (lower).

Therefore, in the second illustrative aspect, when increasing the transfer current It, the control circuit 62 sets the duty ratio of the PWM signal S1 larger during the predetermined times K1, K2, K2-1, K3 from the increase start timings (the time point t0, t2, t4, and t8) than the value immediately after elapse of the respective predetermined times. In other words, after elapse of the predetermined times (K1, K2, K2-1, and K3) from the respective increase start timings (the time points t0, t2, t4, and t8), the control circuit 62 decreases the duty ratio of the PWM signal S1 from the respective duty ratio during predetermined time (K1, K2, K2-1, and K3) to the respective predetermined duty ratio (40%, 50%, 60%, and 65%). Specifically, the control circuit 62 determines the PWM-changing gain (the correction amount of the value of the control signal) during the predetermined times K2, K3 in accordance with the calculated load resistance and the value of the transfer current It (a detection value of the output signal). By determining in this manner, the production tolerance of the transistor T1 is compensated, and the delay in start-up of the transfer current It can be suitably reduced.

Note that, in the second illustrative aspect, the duty ratio of the PWM signal S1 during the initial wait time K1 does not necessarily have to be set larger than the value immediately after elapse of the predetermined time.

Other Illustrative Aspects

The present invention is not limited to the illustrative aspects described as above with reference to the drawings. For example, illustrative aspects as follows are also included within the scope of the present invention.

(1) In the above-described illustrative aspects, the control circuit 62 (an illustration of a "speed change device") may change between a full-speed mode for forming the image at a first speed and a half-speed mode for forming the image at a second speed that is lower than the first speed with setting the initial duty ratio (the start control signal value) of the PWM signal S1 in the half-speed mode smaller than the initial duty ratio in the full-speed mode. In this case, generation of over-current can be suitably reduced without causing lower image quality of the printed matter in each of the full-speed mode or the half-speed mode.

(2) In the above-described illustrative aspects, the control circuit 62 (an illustration of a "change device") may include, in addition to the start-up mode and the normal mode, a determination mode for determining the initial duty ratio (the start control signal value). In the determination mode, the control circuit 62 sequentially changes the duty ratio of the PWM signal S1 while supplying the changed PWM signal 51 to the applying circuit 60 and determines the duty ratio equal to or more than the ratio when the applying circuit 60 starts outputting as the initial duty ratio (the start control signal value) of the PWM signal S1. In this case, the more suitable initial duty ratio of the PWM signal S1 may be determined.

(3) In the first illustrative aspect, the initial duty ratio (Initial_Duty) is determined illustratively in accordance with the inflow current Ir. The initial duty ratio (Initial_Duty) does not necessarily have to be determined in accordance with the inflow current Ir. In order to increase the transfer current It, it is only necessary for the initial duty ratio (Initial_Duty) to be set larger during the predetermined time K1 from the increase start timing (the time point t0 in FIG. 4) than the duty ratio immediately after elapse of the predetermined time.

(4) The configuration of the first illustrative aspect may be added to the second illustrative aspect. That is, in the second illustrative aspect, the initial duty ratio (the start control signal value) of the PWM signal 51 may be determined further in accordance with the inflow current Ir as illustrated in the first illustrative aspect.

(5) In the above-described illustrative aspects, the predetermined time K1, K2, K2-1, K3 are arbitrarily determined as required and previously by experiments etc.

(6) In the above-described illustrative aspects, the predetermined output signal is illustratively a transfer current (a current signal) It for which constant current control is performed. The present invention is not limited to this. For example, the predetermined output signal may be a voltage signal for which constant voltage control is performed.

(7) In the above-described illustrative aspects, the control signal is illustratively the PWM signal while the value of the control signal being the duty ratio of the PWM signal. The present invention is not limited to this. For example, the control signal may be a direct current signal while the value of the control signal being a voltage value of the direct current signal. In this case, the smoothing circuit 64 is needless.

(8) In the above-described illustrative aspects, the control signal is illustratively the PWM signal while the value of the control signal being the duty ratio of the PWM signal and, in order to increase the value of the control signal, the duty ratio of the PWM signal is increased. The present invention is not limited to this. For example, the value of the control signal may be a value of a base signal supplied to a base of the transistor T1 of the voltage step-up circuit 66 and, in order to increase the value of the control signal (the value of the base signal), the duty ratio of the PWM signal may be decreased.

What is claimed is:

1. An image forming apparatus comprising:

an image forming device configured to form an image on a recording medium and including a transfer device, the transfer device for transferring the image to the recording medium;

an applying device configured to generate a predetermined output signal and apply the output signal to the transfer device; and a controller configured to generate a control signal to supply to the applying device so as to control a value of the output signal so that the value of the output signal is within a predetermined target range and control the applying device using the control signal in a start-up mode and in a normal mode, the start-up mode being for starting the applying device, the normal mode being subsequent to the start-up mode, the start-up mode including a first predetermined time period and a time period after the first predetermined time period, wherein, during the first predetermined time period in the start-up mode, the controller outputs the control signal at a start control signal value, which is a value larger than a value of the control signal output during the time period after the first predetermined time period.

2. The image forming apparatus according to claim 1, wherein:

the controller sets the start control signal value at the value for the applying device to start and for the output signal of the applying device to reach the predetermined target range before the recording medium reaches an image forming position by the image forming device.

3. The image forming apparatus according to claim 1, wherein:

the controller sets the start control signal value larger than the value of the control signal in the normal mode.

4. The image forming apparatus according to claim 1, wherein:

in the start-up mode after the first predetermined time, the controller sets the value of the control signal smaller than the value in the normal mode.

5. The image forming apparatus according to claim 4, wherein:

after the first predetermined time, the controller gradually increases the value of the control signal.

6. The image forming apparatus according to claim 5, wherein:

when increasing the value of the control signal, the controller sets the value of the control signal during a second predetermined time larger than the value of the control signal immediately after the second predetermined time, the second predetermined time being from an increase start timing of the value of the control signal.

7. The image forming apparatus according to claim 6 further comprising:

an output detecting device configured to detect the output signal; and a calculating device configured to calculate a load resistance of the applying device on a basis of a detection value of the output signal detected by the output detecting device, wherein the controller determines a correction amount of the value of the control signal during the second or a third predetermined time in accordance with the detection value of the output signal and the calculated load resistance.

8. The image forming apparatus according to claim 1, wherein:

in the normal mode, when the output signal has come below the predetermined target range and the controller increases the value of the control signal so as to increase the output signal, the controller sets the value of the control signal during a third predetermined time larger than the value of the control signal after the third predetermined time, the third predetermined time being from an increase start timing of the value of the control signal.

9. The image forming apparatus according to claim 1 further comprising:

a determination mode for determining the start control signal value; and a change device configured to sequentially change the value of the control signal in the determination mode, wherein the controller supplies the control signal changed by the change device to the applying device and determines a value equal to or more than the value of the control signal when the applying device has started outputting as the start control signal value.

10. The image forming apparatus according to claim 1, wherein:

the image forming device includes a photosensitive body and a charge device for charging the photosensitive body, wherein the controller sets the predetermined time and the start control signal value in accordance with an inflow current that flows into the transfer device from the photosensitive body due to the charging.

11. The image forming apparatus according to claim 1 further comprising:

a speed change device configured to change between a full-speed mode for forming the image at a first speed and a half-speed mode for forming the image at a second speed, the second speed being lower than the first speed, wherein:

the controller sets the start control signal value in the half-speed mode smaller than the start control signal value in the full-speed mode.

12. An image forming apparatus comprising:

an image forming device configured to form an image on a recording medium and including a transfer device, the transfer device for transferring the image to the recording medium;

an applying device configured to generate a predetermined output signal and apply the output signal to the transfer device; and a controller configured to generate a control signal for controlling a value of the output signal so that the value is within a predetermined target range and supply the control signal to the applying device, wherein, when increasing the output signal, the controller outputs, for a predetermined time, the control signal at a value larger than a value immediately after the predetermined time, the predetermined time being identified with a time of an increase of the output signal.

13. The image forming apparatus according to claim 12 further comprising a start-up mode for starting up the applying device and a normal mode subsequent to the start-up mode, wherein, in the start-up mode, the controller sets the value of the control signal during a first predetermined time larger than the value immediately after the first predetermined time, the first predetermined time being from a start timing of the start-up mode.

14. The image forming apparatus according to claim 13, wherein:

when increasing the value of the control signal after the first predetermined time, the controller sets the value of the control signal during a second predetermined time larger than the value of the control signal immediately after the second predetermined time, the second predetermined time being from an increase start timing of the value of the control signal.

15. In the image forming apparatus according to claim 13, wherein:

in the normal mode, when the output signal has come below the predetermined target range and the controller increases the value of the control signal so as to increase the output signal, the controller sets the value of the control signal during a third predetermined time larger than the value of the control signal immediately after the third predetermined time, the third predetermined time being from an increase start timing of the value of the control signal.

16. The image forming apparatus according to claim 12 further comprising:

an output detecting device configured to detect the output signal; and a calculating device configured to calculate a load resistance of the applying device on a basis of a detection value of the output signal detected by the output detecting device, wherein:

the controller determines a length of the predetermined time and a correction amount of the value of the control signal during the predetermined time in accordance with a detection value of the output signal and the calculated load resistance.

17. The image forming apparatus according to claim 12 further comprising an inflow current detecting device, wherein:

the image forming device includes a photosensitive body, and a charge device for charging the photosensitive body;

the inflow current detecting device detects an inflow current that flows into the transfer device from the photosensitive body due to the charging; and the controller determines a length of the predetermined time and the value of the control signal during the predetermined time in accordance with the inflow current.

* * * * *